US011276852B2

(12) United States Patent
Jang

(10) Patent No.: US 11,276,852 B2
(45) Date of Patent: Mar. 15, 2022

(54) LITHIUM METAL SECONDARY BATTERY CONTAINING AN ELASTIC ANODE-PROTECTING LAYER

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 1 day.

(21) Appl. No.: 16/166,536

(22) Filed: Oct. 22, 2018

(65) Prior Publication Data

US 2019/0393541 A1    Dec. 26, 2019

Related U.S. Application Data

(63) Continuation-in-part of application No. 16/014,614, filed on Jun. 21, 2018.

(51) Int. Cl.
*H01M 4/36*     (2006.01)
*H01M 10/052*   (2010.01)
*H01M 4/38*     (2006.01)

(52) U.S. Cl.
CPC .......... *H01M 4/366* (2013.01); *H01M 4/382* (2013.01); *H01M 10/052* (2013.01)

(58) Field of Classification Search
CPC .... H01M 10/052; H01M 4/133; H01M 4/405; H01M 2004/028; H01M 2004/027
See application file for complete search history.

(56) References Cited

U.S. PATENT DOCUMENTS

| 2,798,878 A | 7/1957 | Hummers |
| 3,836,511 A | 9/1974 | O'farrell et al. |

(Continued)

FOREIGN PATENT DOCUMENTS

| CN | 103258990 A | 8/2013 |
| CN | 104103809 A | 10/2014 |

(Continued)

OTHER PUBLICATIONS

Feng et al., Silicon-based anodes for lithium-ion batteries: from fundamentals to practical applications, Small, 14 (2018), p. 1702737. (Year: 2018).*

(Continued)

*Primary Examiner* — Amanda C. Walke

(57) ABSTRACT

Provided is a lithium metal secondary battery comprising a cathode, an anode, and a non-solid state electrolyte without a porous separator disposed between the cathode and the anode, wherein the anode comprises: (a) an anode active material layer containing a layer of lithium or lithium alloy, in a form of a foil, coating, or multiple particles aggregated together, as an anode active material; and (b) an anode-protecting layer in physical contact with the anode active material layer, having a thickness from 1 nm to 100 μm and comprising an elastomer having a fully recoverable tensile elastic strain from 2% to 1,000% and a lithium ion conductivity from $10^{-8}$ S/cm to $5\times10^{-2}$ S/cm when measure at room temperature; wherein the lithium metal secondary battery does not include a lithium-sulfur battery or a lithium-selenium battery.

22 Claims, 5 Drawing Sheets

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,218,055 B1 | 4/2001 | Shah et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 10,483,533 B2 | 11/2019 | Zhamu et al. |
| 2002/0034685 A1 | 3/2002 | Sato et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |
| 2005/0034993 A1 | 2/2005 | Gozdz et al. |
| 2005/0042515 A1 | 2/2005 | Hwang et al. |
| 2005/0095504 A1 | 5/2005 | Kim et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2006/0263697 A1 | 11/2006 | Dahn et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0064409 A1 | 3/2012 | Zhamu et al. |
| 2012/0070708 A1 | 3/2012 | Ohira et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0162641 A1 | 6/2015 | Visco et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |
| 2016/0181611 A1 | 6/2016 | Cho et al. |
| 2016/0218341 A1 | 7/2016 | Kumar et al. |
| 2016/0240896 A1 | 8/2016 | Zhang et al. |
| 2016/0301075 A1 | 10/2016 | Zhamu et al. |
| 2016/0336625 A1 | 11/2016 | Jeong et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0018799 A1 | 1/2017 | Jeong |
| 2017/0033357 A1 | 2/2017 | Cho et al. |
| 2017/0047584 A1 | 2/2017 | Hwang et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0104217 A1 | 4/2017 | Yu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0288211 A1 | 10/2017 | Zhamu et al. |
| 2017/0294643 A1 | 10/2017 | Burshtain et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0053978 A1 | 2/2018 | Song et al. |
| 2018/0083265 A1 | 3/2018 | Singh et al. |
| 2018/0219215 A1 | 8/2018 | Bucur et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |
| 2018/0248173 A1 | 8/2018 | Pan et al. |
| 2018/0277913 A1 | 9/2018 | Pan et al. |
| 2018/0287142 A1 | 10/2018 | Zhamu et al. |
| 2018/0294475 A1 | 10/2018 | Zhamu et al. |
| 2018/0294476 A1 | 10/2018 | Zhamu et al. |
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0088958 A1 | 3/2019 | Viner et al. |
| 2019/0260028 A1 | 8/2019 | Zhamu et al. |
| 2019/0319303 A1 | 10/2019 | Kushida et al. |
| 2019/0386332 A1 | 12/2019 | Zhamu et al. |
| 2019/0393466 A1 | 12/2019 | Lin et al. |

(56) References Cited

U.S. PATENT DOCUMENTS

| | | |
|---|---|---|
| 2019/0393495 A1 | 12/2019 | He et al. |
| 2019/0393510 A1 | 12/2019 | He et al. |
| 2019/0393543 A1 | 12/2019 | Zhamu et al. |

FOREIGN PATENT DOCUMENTS

| | | |
|---|---|---|
| CN | 105322132 A | 2/2016 |
| CN | 108899472 A | 11/2018 |
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017034656 A1 | 3/2017 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

Choi et al., "Highly elastic binders integrating polyrotaxanes for silicon microparticle anodes in lithium ion batteries" Science (2017) vol. 357, No. 6348, pp. 279-283.

Elabd et al., "Sulfonation and Characterization of Poly(styrene-isobutylene-styrene) Triblock Copolymers at High Ion-Exchange Capacities" Polymer (2004) vol. 45, pp. 3037-3043.

PCT/US18/43421 International Search Report and Written Report dated Oct. 11, 2018, 13 pages.

Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.

"Nylon" en.wikipedia.org/wiki/Nylon. Accessed Feb. 18, 2020 (Year: 2020).

An et al., "Diameter-Selected Synthesis of Single Crystalline Trigonal Selenium Nanowires" Materials Chemistry and Physics (2007) vol. 101, No. 2-3, pp. 357-361.

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

AZO Materials Table of Properties on Styrene Butadiene Rubber, 5 pages.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.

Ji et al., "A highly ordered nanostructured carbon-sulphur cathode for lithium-sulphur batteries" Nature Materials (2009) vol. 8, pp. 500-506.

Karlicky et al., "Halogenated Graphenes: Rapidly Growing Family of Graphene Derivatives" ACS Nano (2013) vol. 7, No. 8, pp. 6434-6464.

KR-10-2015-0044333 English language translation.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Liu et al., "Solutions for the problems of silicon-carbon anode materials for lithium-ion batteries" Royal Society Open Science (2018) vol. 5, p. 172370.

Luesakul et al., "Shape-controlled synthesis of cubic-like selenium nanoparticles via the self-assembly method" Carbohydrate Polymers (2016) vol. 153, pp. 435-444.

PCT/US17/18452 International Search Report and Written Opinion dated Apr. 25, 2017, 9 pages.

PCT/US18/16404 International Search Report and Written Opinion dated Apr. 13, 2018, 11 pages.

PCT/US18/16410 International Search Report and Written Opinion dated Apr. 20, 2018, 10 pages.

PCT/US18/16418 International Search Report and Written Opinion dated Apr. 25, 2018, 9 pages.

PCT/US18/16423 International Search Report and Written Opinion dated Apr. 24, 2018, 9 pages.

PCT/US18/16426 International Search Report and Written Opinion dated Apr. 24, 2018, 9 pages.

PCT/US18/16431 International Search Report and Written Opinion dated Apr. 26, 2018, 6 pages.

PCT/US18/20892 International Search Report and Written Opinion dated May 2, 2018, 6 pages.

PCT/US18/25135 International Search Report and Written Opinion dated Jun. 27, 2018, 14 pages.

PCT/US18/25150 International Search Report and Written Opinion dated Jun. 29, 2018, 14 pages.

PCT/US18/25160 International Search Report and Written Opinion dated Nov. 21, 2018, 12 pages.

PCT/US18/25163 International Search Report and Written Opinion dated Jul. 27, 2018, 19 pages.

PCT/US18/43435 International Search Report and Written Opinion dated Jan. 7, 2019, 14 pages.

PCT/US19/18931 International Search Report and Written Opinion dated May 8, 2019, 13 pages.

PCT/US19/19061 International Search Report and Written Opinion dated May 13, 2019, 11 pages.

PCT/US19/19062 International Search Report and Written Opinion dated May 13, 2019, 9 pages.

PCT/US19/20214 International Search Report and Written Opinion dated May 2, 2019, 7 pages.

PCT/US19/20222 International Search Report and Written Opinion dated May 3, 2019, 7 pages.

PCT/US19/21137 International Search Report and Written Opinion dated Jun. 18, 2019, 13 pages.

PCT/US19/27147 International Search Report and Written Opinion dated Aug. 1, 2019, 16 pages.

PCT/US19/36748 International Search Report and Written Opinion dated Oct. 16, 2019, 11 pages.

PCT/US19/37690 International Search Report and Written Opinion dated Oct. 18, 2019, 18 pages.

(56) References Cited

OTHER PUBLICATIONS

PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
CN 2018800380346; Chinese Office Action dated Oct. 29, 2021; 21 pages.
JP 2019555198; Japanese Office Action dated Nov. 9, 2021; 5 pages.

* cited by examiner

LITHIUM METAL SECONDARY BATTERY CONTAINING AN ELASTIC ANODE-PROTECTING LAYER

CROSS REFERENCE TO RELATED APPLICATIONS

The present application is a continuation-in-part of U.S. patent application Ser. No. 16/014,614, filed Jun. 21, 2018, which is hereby incorporated by reference for all purposes.

FIELD OF THE INVENTION

The present invention relates to the field of rechargeable lithium metal battery having a lithium metal layer (in a form of thin lithium foil, coating, or sheet of lithium particles) as an anode active material and a method of manufacturing same.

BACKGROUND OF THE INVENTION

Lithium-ion and lithium (Li) metal cells (including lithium metal secondary cell, lithium-sulfur cell, lithium-selenium cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI$—$Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and the liquid electrolyte) does not have and cannot maintain a good contact with the lithium metal. This effectively reduces the effectiveness of the electrolyte to support dissolution of lithium ions (during battery discharge), transport lithium ions, and allowing the lithium ions to re-deposit back onto the lithium anode (during battery recharge).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier-to-implement approach to preventing Li metal dendrite-induced internal short circuit and thermal runaway problems in Li metal batteries, and to reducing or eliminating the detrimental reactions between lithium metal and the electrolyte.

Hence, an object of the present invention was to provide an effective way to overcome the lithium metal dendrite and reaction problems in all types of Li metal batteries having a lithium metal anode. A specific object of the present invention was to provide a lithium metal cell that exhibits a high specific capacity, high specific energy, high degree of safety, and a long and stable cycle life.

SUMMARY OF THE INVENTION

Herein reported is a lithium metal secondary battery comprising a cathode (positive electrode), an anode (negative electrode), and a non-solid state electrolyte without a porous separator disposed between the cathode and the anode, wherein the anode comprises: (a) an anode active material layer containing a layer of lithium or lithium alloy, in a form of a foil, coating, or multiple particles aggregated together, as an anode active material; and (b) an anode-protecting layer in physical contact with the anode active material layer, having a thickness from 1 nm to 100 μm and comprising an elastomer having a fully recoverable tensile elastic strain from 2% to 1,000% and a lithium ion conductivity from $10^{-8}$ S/cm to $5 \times 10^{-2}$ S/cm when measure at room temperature; wherein the lithium metal secondary battery does not include a lithium-sulfur battery or lithium-selenium battery.

Preferably, the anode active material layer, the elastomer-based anode-protecting layer, and the cathode layer are laminated together in such a manner (e.g. roll-pressed together) that the resulting cell is under a compressive stress or strain for the purpose of maintaining a good contact between the anode active material layer and the anode-protecting layer.

In the lithium metal secondary battery, the non-solid state electrolyte is selected from organic liquid electrolyte, ionic liquid electrolyte, polymer gel electrolyte, quasi-solid electrolyte having a lithium salt dissolved in an organic or ionic liquid with a lithium salt concentration higher than 2.0 M (from 2.0M to 14 M; typically from 2.5 M to 10 M; and more typically from 3.5M to 7 M), or a combination thereof.

It is well-known in the art that a porous separator may not be necessary if the electrolyte is a solid-state electrolyte; but, a porous separator is normally required in order to electronically separate the anode from the cathode if the electrolyte contains a liquid ingredient, such as in an organic liquid electrolyte, ionic liquid electrolyte, polymer gel electrolyte (polymer+liquid solvent), and quasi-solid electrolyte. The elastomer-based anode-protecting layer itself acts as a separator to electrically isolate the anode and the cathode. This protective layer, being as thin as a few nanometers and typically from 10 nm to 10 μm, is significantly thinner than the typically >20 μm in thickness of the conventional porous separator. Yet, this elastomer also plays the roles of protecting the lithium anode, preventing lithium dendrite formation and penetration, provides an environment conducive to uniform and uninterrupted transport and re-deposition of lithium ions, etc. The reduced weight and volume also leads to increased specific energy (Wh/kg) and volumetric energy density (Wh/L).

The foil or coating of lithium or lithium alloy may be supported by a current collector (e.g. a Cu foil, a Ni foam, a porous layer of nanofilaments, such as graphene sheets, carbon nanofibers, carbon nanotubes, etc.).

For defining the claims, the invented lithium metal secondary battery does not include a lithium-sulfur cell or lithium-selenium cell. As such, the cathode does not include sulfur, lithium polysulfide, selenium, and lithium polyselenide.

The elastomer (sulfonated or non-sulfonated) is a high-elasticity material which exhibits an elastic deformation that is at least 2% (preferably at least 5% and up to approximately 1,000%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%.

In some embodiments, the elastomer preferably and more typically has a fully recoverable elastic tensile strain from 5% to 300% (most typically from 10% to 150%), a thickness from 10 nm to 20 μm, and an electrical conductivity of at least $10^{-4}$ S/cm when measured at room temperature on a cast thin film 20 μm thick.

Preferably, the elastomer contains a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These elastomers or rubbers, when present without graphene sheets, exhibit a high elasticity (having a fully recoverable tensile strain from 2% to 1,000%). In other words, they can be stretched up to 1,000% (10 times of the original length when under tension) and, upon release of the tensile stress, they can fully recover back to the original dimension. By adding from 0.01% to 50% by weight of a conductive reinforcement material and/or a lithium ion-conducting species dispersed in an elastomeric matrix material, the fully recoverable tensile strains are typically reduced down to 2%-500% (more typically from 5% to 300% and most typically from 10% to 150%).

The elastomer, if sulfonated, becomes significantly more lithium ion-conducting. The lithium ion conductivity of an elastomer, sulfonated or un-sulfonated, may be further improved if some desired amount of lithium ion-conducting additive is incorporated into the elastomer matrix.

It may be noted that lithium foil/coating layer may decrease in thickness due to dissolution of lithium into the electrolyte to become lithium ions as the lithium battery is discharged, creating a gap between the current collector and the protective layer if the protective layer were not elastic. Such a gap would make the re-deposition of lithium ions back to the anode impossible. We have observed that the instant elastomer layer is capable of expanding or shrinking congruently or conformably with the anode layer. This capability helps to maintain a good contact between the current collector (or the lithium film itself) and the protective layer, enabling the re-deposition of lithium ions without interruption.

The elastomer may further contain a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

At the anode side, preferably and typically, the elastomer in the protective layer is designed or selected to have a lithium ion conductivity no less than $10^{-5}$ S/cm, more preferably no less than $10^{-4}$ S/cm, and most preferably no less than $10^{-3}$ S/cm. Some of the selected elastomers, when sulfonated, can exhibit a lithium-ion conductivity greater than $10^{-2}$ S/cm. In some embodiments, the elastomer is an elastomer containing no additive or filler dispersed therein. In others, the elastomer composite is an elastomer matrix composite containing from 0.1% to 40% by weight (preferably from 1% to 30% by weight) of a lithium ion-conducting additive dispersed in an elastomer matrix material.

In some embodiments, the elastomer is selected from a sulfonated or un-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, or a combination thereof.

In some embodiments, the elastomer further contains a lithium ion-conducting additive dispersed therein, wherein the lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, 0<x≤1 and 1≤y≤4.

In some embodiments, the elastomer may form a mixture, blend, or semi-IPN with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

In certain embodiments, the elastomer comprises from 0.01% to 50% of an electrically non-conducting reinforcement material dispersed therein, wherein the reinforcement material is selected from a glass fiber, ceramic fiber, polymer fiber, or a combination thereof. The electrically non-conductive reinforcement may also be selected from glass particles, ceramic particles, polymer particles, etc. The reinforcement material can increase the mechanical strength and the lithium dendrite penetration resistance of the elastomer layer.

The cathode active material may be selected from an inorganic material, an organic material, a polymeric material, or a combination thereof. The inorganic material may be selected from a metal oxide, metal phosphate, metal silicide, metal selenide, metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of CoF$_3$, MnF$_3$, FeF$_3$, VF$_3$, VOF$_3$, TiF$_3$, BiF$_3$, NiF$_2$, FeF$_2$, CuF$_2$, CuF, SnF$_2$, AgF, CuCl$_2$, FeCl$_3$, MnCl$_2$, and combinations thereof. In certain preferred embodiments, the inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from TiS$_2$, TaS$_2$, MoS$_2$, NbSe$_3$, MnO$_2$, CoO$_2$, an iron oxide, a vanadium oxide, or a combination thereof.

The cathode active material layer may contain a metal oxide containing vanadium oxide selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a sulfonated elastomer composite layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

The present invention also provides a lithium metal-air battery comprising an air cathode, an anode comprising the anode-protecting layer as defined above and disposed between the anode and the air cathode without using a conventional porous separator or membrane. In the air cathode, oxygen from the open air (or from an oxygen supplier external to the battery) is the primary cathode active material. The air cathode needs an inert material to support the lithium oxide material formed at the cathode. The applicants have surprisingly found that an integrated structure of conductive nanofilaments can be used as an air cathode intended for supporting the discharge product (e.g., lithium oxide).

Hence, a further embodiment of the present invention is a lithium metal-air battery, wherein the air cathode comprises an integrated structure of electrically conductive nanometer-scaled filaments that are interconnected to form a porous network of electron-conducting paths comprising interconnected pores, wherein the filaments have a transverse dimension less than 500 nm (preferably less than 100 nm). These nanofilaments can be selected from carbon nanotubes (CNTs), carbon nanofibers (CNFs), graphene sheets, carbon fibers, graphite fibers, etc.

The invention also provides a method of manufacturing a lithium battery, the method comprising: (a) providing a cathode active material layer and an optional cathode current collector to support the cathode active material layer; (b) providing an anode active material layer (containing a lithium metal or lithium alloy foil or coating) and an optional anode current collector to support the lithium metal or lithium alloy foil or coating; (c) providing an electrolyte in contact with the anode active material layer and the cathode active material layer without using a separator to electrically separate the anode and the cathode; (d) providing an anode-protecting layer of an elastomer having a recoverable tensile elastic strain from 2% to 1,000% (preferably from 5% to 300%), a lithium ion conductivity no less than $10^{-8}$ S/cm at room temperature, and a thickness from 1 nm to 100 μm (preferably from 10 nm to 10 μm). This anode-protecting layer is disposed between the lithium metal or lithium alloy foil/coating and the cathode.

The invention also provides a method of improving the cycle-life of a lithium metal secondary battery (not including a lithium-sulfur battery or lithium-selenium battery). The method comprises implementing an anode-protecting layer between an anode active material layer and a cathode electrode without using a porous separator. The anode-protecting layer comprises an elastomer having a recoverable tensile elastic strain from 2% to 1,000% (preferably from 5% to 300%), a lithium ion conductivity no less than $10^{-8}$ S/cm (preferably >$10^{-5}$ S/cm) at room temperature, and a thickness from 1 nm to 100 μm (preferably from 10 nm to 10 μm).

In some embodiments, the elastomer contains a material selected from a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the above-defined method, the step implementing an anode-protecting layer may be conducted by depositing a layer of an elastomer onto one primary surface of the anode active material layer. This step comprises optionally compressing the protected anode to improve a contact between the anode-protecting layer and the anode active material layer, followed by combining the protected anode and the cathode together to form the lithium metal secondary battery. A good contact between the anode active material layer and the anode-protecting layer is essential to reducing internal resistance.

In certain embodiments, the step of implementing the anode-protecting layer is conducted by (i) preparing an anode active material layer; (ii) preparing a free-standing layer of an elastomer; and (iii) combining the anode active material layer, the elastomer layer, a cathode, and a non-solid state electrolyte together to form the lithium metal secondary battery. A compressive stress may be advantageously applied (e.g. via press-rolling) to improve the contact between the anode-protecting layer and the anode active material layer to be protected.

Preferably, the elastomer layer has a lithium-ion conductivity from $10^{-5}$ S/cm to $5 \times 10^{-2}$ S/cm. In some embodiments, the elastomer has a recoverable tensile strain from 10% to 300% (more preferably >30%, and further more preferably >50%).

In certain embodiments, the procedure of providing an elastomer contains providing a mixture/blend/composite of an elastomer (sulfonated or un-sulfonated) with a lithium-ion conducting material, a reinforcement material (e.g. glass fibers, polymer fibers, etc.), or a combination thereof.

In this mixture/blend/composite, the lithium ion-conducting material is dispersed in the elastomer and is preferably selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In some embodiments, the lithium ion-conducting material is dispersed in the sulfonated elastomer composite and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The anode-protecting layer implemented between the anode active layer and the cathode is mainly for the purpose of reducing or eliminating the lithium metal dendrite by providing a more stable Li metal-electrolyte interface that is more conducive to uniform deposition of Li metal during battery charges. The anode-protecting layer also acts to block the penetration of any dendrite, if initiated, from reaching the cathode. The anode-protecting layer, being highly elastic, also can shrink or expands conformably, responsive to the thickness increase or decrease of the anode active material layer. Other advantages will become more transparent later.

DESCRIPTION OF THE PREFERRED EMBODIMENTS

Figure 1:
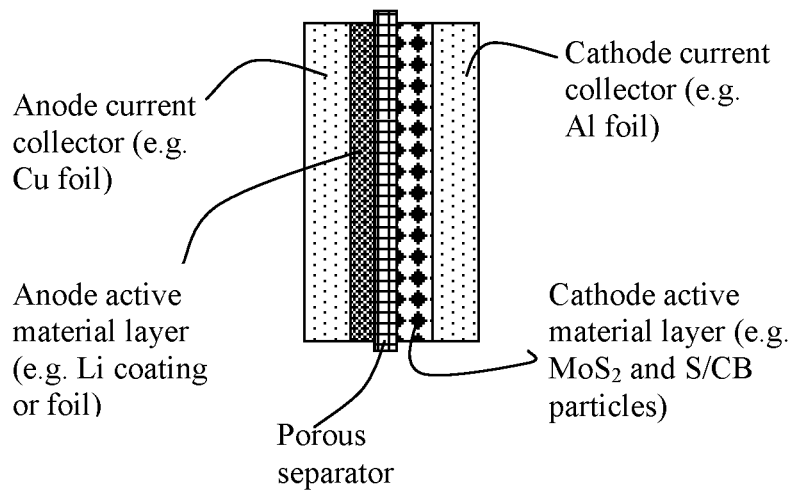
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This invention is directed at a lithium metal secondary battery, which is preferably based on an organic electrolyte, a polymer gel electrolyte, an ionic liquid electrolyte, or a quasi-solid electrolyte; all these are non-solid-state electrolytes. The shape of a lithium metal secondary battery can be cylindrical, square, button-like, etc. The present invention is not limited to any battery shape or configuration or any type of electrolyte. The invented lithium secondary battery does not include a lithium-sulfur cell or lithium-selenium cell.

The invention provides a lithium metal secondary battery, comprising a cathode, an anode, an anode-protecting layer disposed between the cathode and the anode, and a non-solid-state electrolyte.

In certain embodiments, the anode comprises: (a) a layer of lithium or lithium alloy (in the form of a foil, coating, or multiple particles aggregated together) as an anode active material layer; and (b) an anode-protecting layer, in contact with the anode active material layer, having a thickness from 1 nm to 100 μm and comprising an elastomer having a fully recoverable tensile elastic strain from 2% to 1,000%, a lithium ion conductivity from $10^{-8}$ S/cm to $5\times 10^{-2}$ S/cm when measured at room temperature.

The foil or coating of lithium or lithium alloy, as the anode active material layer or electrode, may be supported by a current collector (e.g. a Cu foil, a Ni foam, a porous layer of nanofilaments, such as membrane, paper, or fabric of graphene sheets, carbon nanofibers, carbon nanotubes, etc. forming a 3D interconnected network of electron-conducting pathways).

Preferably, the anode-protecting layer (i.e. the elastomer layer) has a lithium ion conductivity no less than $10^{-6}$ S/cm (typically and desirably from $10^{-5}$ S/cm to $5\times 10^{-2}$ S/cm, measured at room temperature), and a thickness from 10 nm to 20 µm. These conditions are more amenable to allowing lithium ions to migrate in and out of the elastomer layer without much resistance.

Preferably, the elastomer contains a sulfonated or non-sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, polyethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

Preferably, the anode-protecting layer (the elastomer layer) is different in composition than the electrolyte per se used in the lithium battery and maintains as a discrete layer (not to be dissolved in the electrolyte) that is disposed between the anode active material layer (e.g. Li foil) and the cathode. The anode-protecting layer may contain a liquid electrolyte that permeates or impregnates into the sulfonated or non-sulfonated elastomer.

We have discovered that the anode-protecting layer provides several unexpected benefits: (a) the formation of dendrite has been essentially eliminated; (b) uniform deposition of lithium back to the anode side is readily achieved; (c) the layers ensure smooth and uninterrupted transport of lithium ions from/to the lithium foil/coating and through the interface between the lithium foil/coating and the protective layer with minimal interfacial resistance; (d) significant reduction in the amount of dead lithium particles near the Li foil; and (e) cycle stability can be significantly improved and cycle life increased.

In a conventional lithium metal cell, as illustrated in FIG. 1, the anode active material (lithium) is deposited in a thin film form or a thin foil form directly onto an anode current collector (e.g. a Cu foil). The battery is a lithium metal battery, lithium sulfur battery, lithium-air battery, lithium-selenium battery, etc. As previously discussed in the Background section, these lithium secondary batteries have the dendrite-induced internal shorting and "dead lithium" issues at the anode.

Figure 2:
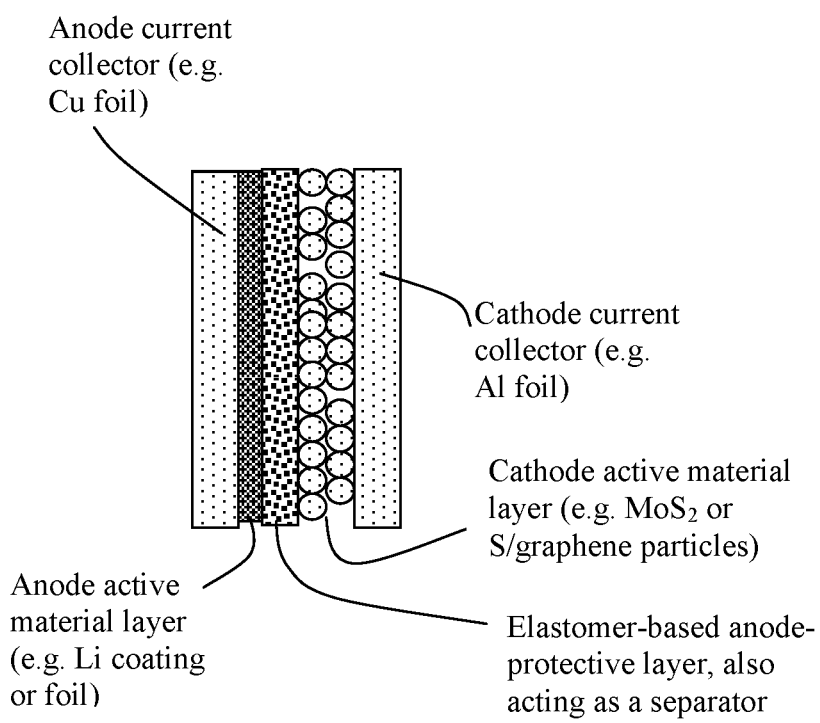
FIG. 2 Schematic of a presently invented lithium metal battery cell containing an anode layer (a thin Li foil or Li coating deposited on a surface of a current collector, Cu foil), a sulfonated elastomer composite-based anode-protecting layer, a porous separator/electrolyte layer (or a layer of solid-state electrolyte), and a cathode active material layer, which is composed of particles of a cathode active material, a conductive additive (not shown) and a resin binder (not shown). A cathode current collector supporting the cathode active layer is also shown.

We have solved these challenging issues that have troubled battery designers and electrochemists alike for more than 30 years by developing and implementing two anode-protecting layers disposed between the lithium foil/coating and the separator layer. As schematically shown in FIG. 2, one embodiment of the present invention is a lithium metal battery cell containing an anode layer (a thin Li foil or Li coating deposited on a surface of a current collector, such as a layer of graphene foam or a sheet of Cu foil), one anode-protecting layer, and a cathode active material layer, which is composed of particles of a cathode active material, a conductive additive (not shown) and a resin binder (not shown). A cathode current collector (e.g. Al foil) supporting the cathode active layer is also shown in FIG. 2. The lithium metal or alloy in the anode may be in a form of particles (e.g. surface-protected or surface-stabilized particles of Li or Li alloy).

The elastomer exhibits an elastic deformation of at least 2% when measured under uniaxial tension. In the field of materials science and engineering, the "elastic deformation" is defined as a deformation of a material (when being mechanically stressed) that is essentially fully recoverable upon release of the load and the recovery is essentially instantaneous. The elastic deformation is preferably greater than 5%, more preferably greater than 10%, further more preferably greater than 30%, and still more preferably greater than 100% but less than 500%.

It may be noted that although FIG. 2 shows a lithium coating preexisting at the anode when the lithium battery is made, this is but one of several embodiments of the instant invention. An alternative embodiment is a lithium battery that does not contain a lithium foil or lithium coating at the anode (only an anode current collector, such as a Cu foil or a graphene/CNT mat) when the battery is made. The needed amount of lithium to be bounced back and forth between the anode and the cathode is initially stored in the cathode active material (e.g. lithium vanadium oxide $Li_xV_2O_5$, instead of vanadium oxide, $V_2O_5$; or lithium transition metal oxide or phosphate, instead of, say, $MoS_2$). During the first charging procedure of the lithium battery (e.g. as part of the electrochemical formation process), lithium comes out of the cathode active material, migrates to the anode side, and deposits on the anode current collector. The presence of the presently invented protective layer enables uniform deposition of lithium ions on the anode current collector surface. Such an alternative battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of prestoring lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically less air-sensitive.

The presently invented lithium secondary batteries can contain a wide variety of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material as a cathode active material for the lithium battery is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \le 1$.

In certain preferred embodiments, the inorganic material as a cathode active material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di (1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

Preferably and typically, the elastomer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the elastomer comprises from 0.1% to 50% (preferably 1% to 35%) by weight of a lithium ion-conducting additive dispersed in an elastomer matrix material. The elastomer must have a high elasticity (elastic deformation strain value >2%). An elastic deformation is a deformation that is fully recoverable and the recovery process is essentially instantaneous (no significant time delay). The elastomer composite can exhibit an elastic deformation from 2% up to 1,000% (10 times of its original length), more typically from 5% to 500%, and further more typically from 10% to 300%, and most typically and desirably from 30% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Further, we have unexpectedly discovered that the presence of an amount of a lithium salt or sodium salt (1-35% by weight) and a liquid solvent (0-50%) can significantly increase the lithium-ion or sodium ion conductivity.

It is also advantageous to disperse a high-strength reinforcement material in the anode-protecting material to increase the strength and dendrite-penetrating strength of the elastomer layer. Suitable reinforcement materials include glass fibers, ceramic fibers (e.g. silicon carbide fibers), polymer fibers (e.g. aromatic polyamide fibers such as Kevlar fibers, nylon fibers, ultrahigh molecular weight polyethylene or UHMW-PE fibers, etc.), and ceramic discs, etc.

Typically, an elastomer is originally in a monomer or oligomer states that can be cured to form a cross-linked polymer that is highly elastic. Prior to curing, these polymers or oligomers are soluble in an organic solvent to form a polymer solution. An ion-conducting additive or a reinforcement may be added to this solution to form a suspension. This solution or suspension can then be formed into a thin layer of polymer precursor on a surface of an anode current collector or a surface of a Li foil. The polymer precursor (monomer or oligomer and initiator) is then polymerized and cured to form a lightly cross-linked polymer. This thin layer of polymer may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and a cathode layer. Polymer layer formation can be accomplished by using one of several procedures well-known in the art; e.g. spraying, spray-painting, printing, coating, extrusion-based film-forming, casting, etc.

One may dispense and deposit a layer of a sulfonated or un-sulfonated elastomer onto a primary surface of the anode active material layer. Alternatively, one may dispense and deposit a layer of an elastomer onto a primary surface of a cathode active material layer. Further alternatively, one may prepare a separate free-standing discrete layer of the elastomer first. This elastomer layer is then laminated between an anode active material layer and a cathode layer to form a battery cell.

Thus, the invention also provides a method of manufacturing a lithium battery, the method comprising: (a) providing a cathode active material layer and an optional cathode current collector to support the cathode active material layer; (b) providing an anode active material layer (containing a lithium metal or lithium alloy foil or coating) and an optional anode current collector to support the lithium metal or lithium alloy foil or coating; (c) providing an anode-protecting layer of an elastomer having a recoverable tensile elastic strain from 2% to 1,000% (preferably from 5% to 300%), a lithium ion conductivity no less than $10^{-8}$ S/cm at room temperature, and a thickness from 1 nm to 100 µm (preferably from 10 nm to 10 µm), wherein the anode-protecting layer is disposed between the cathode active material layer and the anode active material layer and in physical contact therewith (in physical contact with both the anode active material and the cathode active material layer); and (d) providing an electrolyte in contact with the anode active material layer and the cathode active material layer (no additional separator between the anode and the cathode).

The invention also provides a method of improving the cycle-life of a lithium metal secondary battery (not including a lithium-sulfur battery or lithium-selenium battery). The method comprises implementing an elastomer-based, lithium ion-conducting anode-protecting layer between an anode active material layer and a cathode active material layer without using a porous separator.

It may be noted that the presently invented lithium secondary battery comprises at least the following layers: an optional anode current collector (e.g. a Cu foil or a graphene foam), an anode active material layer (e.g. a discrete lithium foil, a lithium coating layer, or a layer of lithium particles) supported by the anode current collector (if present), an anode-protecting layer (elastomer or elastomer composite) substantially fully covering the anode active material layer, an electrolyte but no porous separator or membrane, a cathode active material layer, and an optional cathode current collector (e.g. Al foil, graphene paper sheet, etc.). The electrolyte contains some liquid electrolyte.

There are many different sequences with which these individual layers may be produced and combined together. For instance, one may produce all components in a free-standing form and then combine them together. Alternatively, one may produce certain components in single free-standing films but other components in a 2-layer or 3-layer structure, followed by combining these components and structures together. For instance, one may spray, cast, or coat an elastomer layer onto a primary surface of a cathode layer to form a two-layer structure. This two-layer structure is then laminated with other components (e.g. an anode active material layer, standing alone or coated on a Cu foil) to form a battery cell.

Alternatively, the step of implementing an anode-protecting layer may be conducted by depositing a layer of an elastomer onto one primary surface of an anode active material layer. This step includes optionally compressing the protected anode to improve the contact between the anode-protecting layer and the anode active material layer, followed by combining the protected anode and the cathode together to form a lithium metal secondary battery. A good contact between the anode active material layer and the anode-protecting layer is essential to reducing internal resistance.

In certain embodiments, the step of implementing an anode-protecting layer is conducted by forming a protecting layer of elastomer, followed by laminating the anode active material layer, the elastomer layer, the cathode layer, along with the electrolyte to form the lithium metal secondary battery, wherein an optional (but desirable) compressive stress is applied to improve the contact between the anode-protecting layer and the anode active material layer and/or the cathode active material layer during or after this laminating step.

Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

A broad array of elastomers can be sulfonated to become sulfonated elastomers. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, an elastomer can form a polymer matrix composite containing a lithium ion-conducting additive dispersed in the elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In some embodiments, the elastomer can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In some embodiments, the elastomer may form a mixture, co-polymer, or semi-interpenetrating network with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

The electrolyte for a lithium secondary cell may be an organic electrolyte, ionic liquid electrolyte, gel polymer electrolyte, quasi-solid electrolyte (e.g. containing 2M-14 M of a lithium salt in a solvent) or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K-S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a lithium metal cell.

Example 1: Sulfonation of Triblock Copolymer Poly(Styrene-Isobutylene-Styrene) or SIBS Both non-sulfonated and sulfonated elastomers are used to build the anode-protecting layer in the present invention. The sulfonated versions typically provide a much higher lithium ion conductivity and, hence, enable higher-rate capability or higher power density. The elastomer matrix can contain a lithium ion-conducting additive, an electronically non-conducting reinforcement, and/or a lithium metal-stabilizing additive.

An example of the sulfonation procedure used in this study for making a sulfonated elastomer is summarized as follows: a 10% (w/v) solution of SIBS (50 g) and a desired amount of graphene oxide sheets (0 to 40.5% by wt.) in methylene chloride (500 ml) was prepared. The solution was stirred and refluxed at approximately 40° C., while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of Kevlar® fibers (du Pont) and a lithium metal-stabilizing additives (e.g. LiNO$_3$ and lithium trifluoromethanesulfonimide) were then added into the solution to form slurry samples. The slurry samples were slot-die coated on a PET plastic substrate to form layers of sulfonated elastomer composite. The lithium metal-stabilizing additives were found to impart stability to lithium metal-electrolyte interfaces.

Example 2: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of Nylon fibers (0%-40% by wt.) were introduced into the reactor, and the polymer solution was irradiated for 1 h at room temperature with UV light of 365 nm and power of 100 W.

The resulting thioacetylated polybutadiene (PB-TA)/Nylon fiber composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; H$_2$O$_2$/olefin molar ratio=5) in 20 min. We would like to caution that the reaction is autocatalytic and strongly exothermic. The resulting slurry was cast to obtain sulfonated polybutadiene (PB-SA) composite layers. It may be noted that Nylon fibers or other additives may be added at different stages of the procedure: before, during or after BZP is added.

Example 3: Synthesis of Sulfonated SBS

Sulfonated styrene-butadiene-styrene triblock copolymer (SBS) based elastomer was directly synthesized. First, SBS (optionally along with a lithium ion-conducting additive or electron-conducting additive) is first epoxidized by performic acid formed in situ, followed by ring-opening reaction with an aqueous solution of NaHSO$_3$. In a typical procedure, epoxidation of SBS was carried out via reaction of SBS in cyclohexane solution (SBS concentration=11 g/100 mL) with performic acid formed in situ from HCOOH and 30% aqueous H$_2$O$_2$ solution at 70° C. for 4 h, using 1 wt. % poly(ethylene glycol)/SBS as a phase transfer catalyst. The molar ratio of H$_2$O$_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt. % TEAB/ESBS as a phase transfer catalyst and 5 wt. % DMA/ESBS as a ring-opening catalyst. Herein, TEAB=tetraethyl ammonium bromide and DMA=N,N-dimethyl aniline. An aqueous solution of NaHSO$_3$ and Na$_2$SO$_3$ (optionally along with an additive or reinforcement material, if not added earlier) was then added with vigorous stirring at 60° C. for 7 h at a molar ratio of NaHSO$_3$/epoxy group at 1.8 and a weight ratio of Na$_2$SO$_3$/NaHSO$_3$ at 36%. This reaction allows for opening of the epoxide ring and attaching of the sulfonate group according to the following reaction:

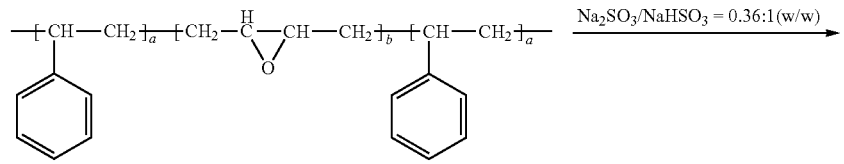

-continued

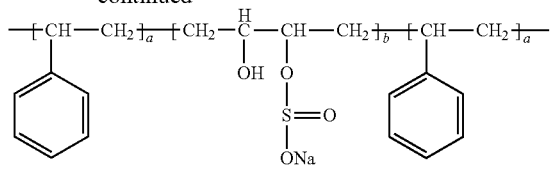

The reaction was terminated by adding a small amount of acetone solution containing antioxidant. The mixture was washed with distilled water and then precipitated by ethanol while being cast into thin films, followed by drying in a vacuum dryer at 50° C. It may be noted electronically non-conducting reinforcement (e.g. polymer fibers) and/or lithium ion-conducting additive (e.g. $Li_2CO_3$ and $NaBF_4$) may be added during various stages of the aforementioned procedure (e.g. right from the beginning, or prior to the ring opening reaction).

Example 4: Synthesis of Sulfonated SBS by Free Radical Addition of Thiolacetic Acid (TAA) Followed by In Situ Oxidation with Per-Formic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! The non-conductive reinforcement material was added before or after this reaction. The resulting slurry was stirred for 1 h, and then most of the solvent was distilled off in vacuum at 35° C. Finally, the slurry containing the sulfonated elastomer, along with desired additives, was added with acetonitrile, cast into films, washed with fresh acetonitrile, and dried in vacuum at 35° C. to obtain layers of sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, desired additives or reinforcement materials may be added at various stages of the procedure.

Example 5: Lithium Battery Containing a Sulfonated Elastomer-Protected Lithium Anode and a Cathode Containing $V_2O_5$ Particles Cathode active material layers were prepared from $V_2O_5$ particles and graphene-embraced $V_2O_5$ particles, respectively. The $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The Li+ exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nanobelt sizes, and then spray-drying at 200° C. to obtain graphene-embraced $V_2O_5$ composite particulates. Selected amounts of $V_2O_5$ particles and graphene-embraced $V_2O_5$ particles, respectively, were then each made into a cathode layer following a well-known slurry coating process.

The sulfonated elastomer films for use as the anode-protecting layer were SIBS as prepared in Example 1. Several tensile testing specimens were cut from the film and tested with a universal testing machine. The results indicate that this series of sulfonated elastomer films have an elastic deformation from approximately 150% to 465%. The addition of up to 30% by weight of a reinforcement material (e.g. Kevlar fibers) and/or an inorganic additive typically reduces this elasticity down to a reversible tensile strain from 6% to 110%.

For electrochemical testing, the working electrodes (cathode layers) were prepared by mixing 85 wt. % $V_2O_5$ or 88% of graphene-embraced $V_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter electrode (actually an anode of a Li-transition metal oxide cell), Celgard 2400 membrane as separator (for the cell containing no anode-protecting elastomer layer), and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cells were evaluated by galvanostatic charge/discharge cycling at a current density of 50 mA/g using an Arbin Electrochemical Testing Station.

Figure 3:
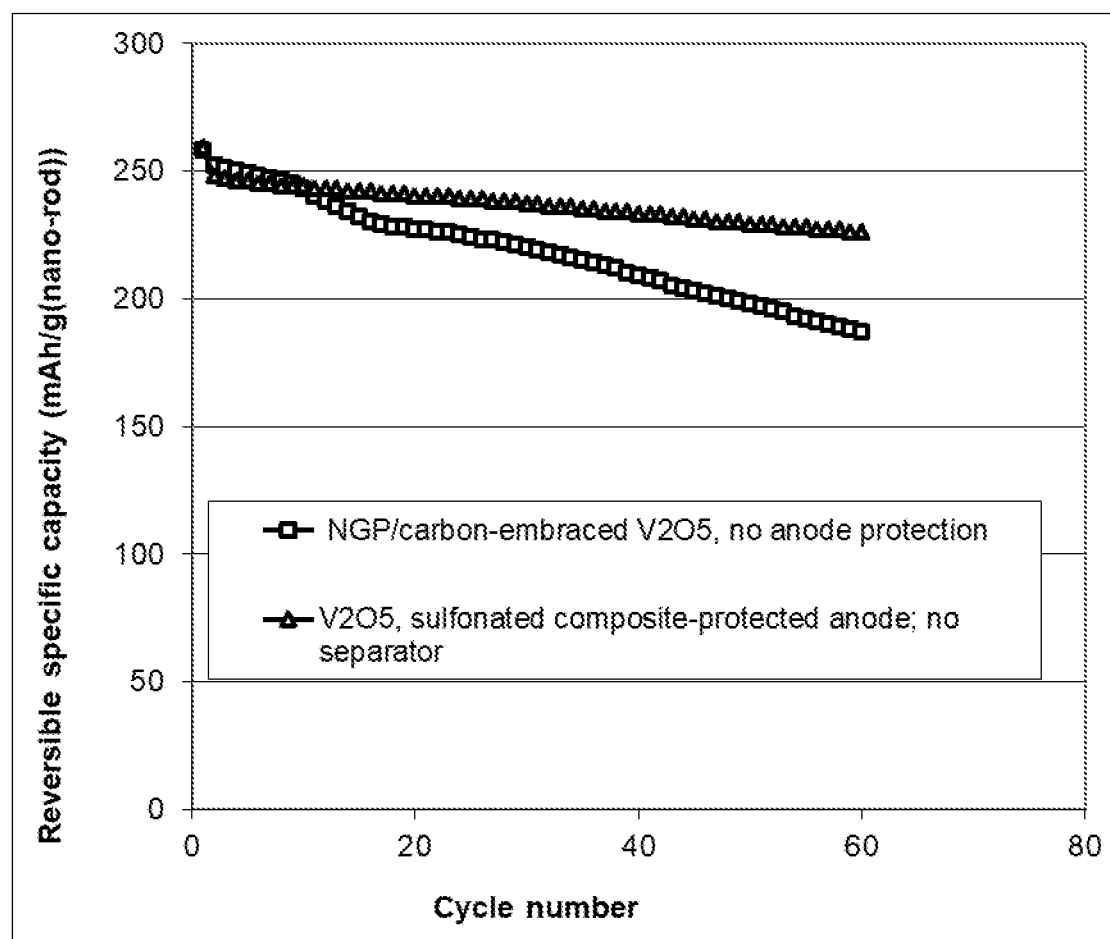
FIG. 3 The specific intercalation capacity curves of two lithium cells: one cell having a cathode containing $V_2O_5$ particles and a sulfonated elastomer-based anode-protecting layer disposed between the anode active material layer (Li foil) and the cathode layer and the other cell having a cathode containing graphene-embraced $V_2O_5$ particles, but having no anode-protecting protecting layer.

Summarized in FIG. 3 are the specific intercalation capacity curves of two lithium cells: one cell having a cathode containing $V_2O_5$ particles and a sulfonated elastomer-based anode-protecting layer disposed between the anode active material layer (Li foil) and the cathode layer and the other cell having a cathode containing graphene-embraced $V_2O_5$ particles, but having no anode-protecting protecting layer. As the number of cycles increases, the specific capacity of the un-protected cells drops at a much faster rate. In contrast, the presently invented approach of an elastomer-based anode-protecting layer (even without the use of a conventional porous separator) provides the battery cell with a stable cycling behavior. These data have clearly demonstrated the surprising and superior performance of the presently invented anode protection approach for the lithium metal layer.

The sulfonated elastomer-based protective layer appears to be capable of reversibly deforming to a great extent without breakage when the lithium foil decreases in thickness during battery discharge. The protective layer also prevent the continued reaction between liquid electrolyte and lithium metal at the anode, reducing the problem of continuing loss in lithium and electrolyte. This also enables a significantly more uniform deposition of lithium ions upon returning from the cathode during a battery re-charge step; hence, no lithium dendrite. These were observed by using SEM to examine the surfaces of the electrodes recovered from the battery cells after some numbers of charge-discharge cycles.

Example 6: Sulfonated Elastomer Implemented in the Anode of a Lithium-LiCoO$_2$ Cell (Initially the Cell Anode has an Ultra-Thin Lithium Layer, <1 μm Thick)

The sulfonated elastomer as a lithium-protecting layer was based on the sulfonated polybutadiene (PB) prepared according to a procedure used in Example 2. Tensile testing was also conducted on the sulfonated elastomer films (without the conductive reinforcement material). This series of sulfonated elastomers can be elastically stretched up to approximately 135% (having some lithium salt or conductive reinforcement material dispersed therein) or up to 770% (with no additive).

Figure 4:
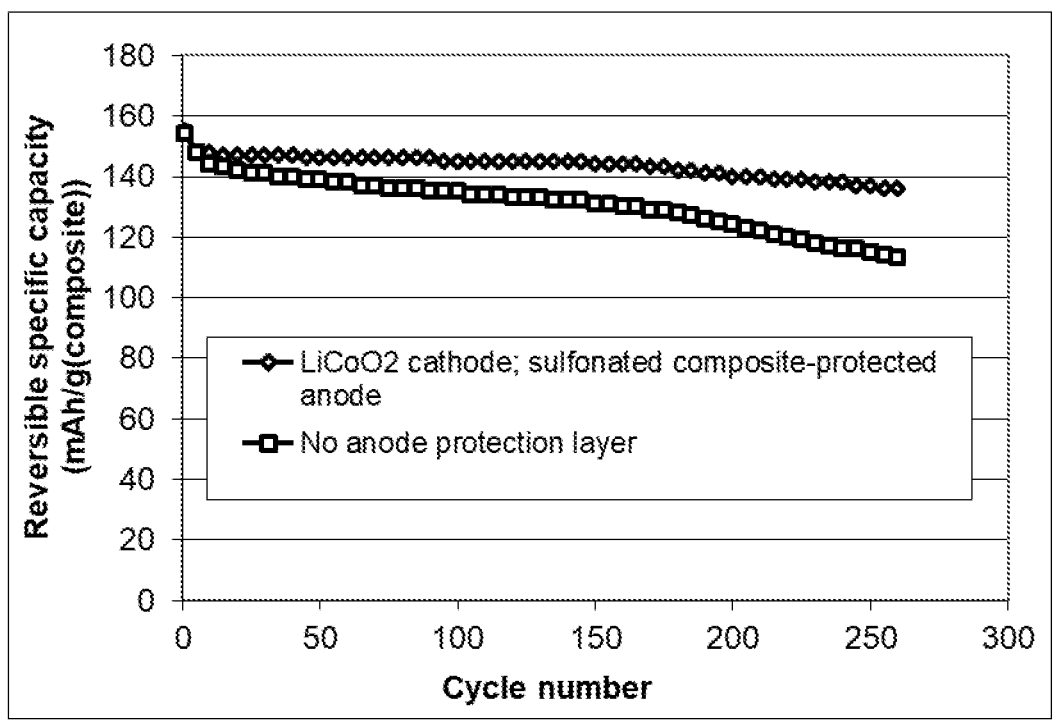
FIG. 4 The specific capacity values of two lithium-$LiCoO_2$ cells (initially the cell being lithium-free); one cell featuring a high-elasticity sulfonated elastomer layer at the anode and the other cell containing no anode protection layer.

FIG. 4 shows the specific lithium intercalation capacity of two lithium-LiCoO$_2$ cells (initially the cell being lithium-free); one cell featuring a high-elasticity sulfonated elastomer layer at the anode and the other cell containing no anode protection layer. These data indicate that the cell having a sulfonated PB-based anode-protecting layer offers significantly more stable cycling behavior. The sulfonated elastomer also acts to isolate the liquid electrolyte from the lithium coating yet still allowing for easy diffusion of lithium ions.

Example 7: Li Metal Cells Containing Transition Metal Fluoride Nanoparticle-Based Cathode and a Sulfonated Elastomer-Based Anode-Protecting Layer This sulfonated elastomer layer was based on sulfonated styrene-butadiene-styrene triblock copolymer (SBS). Tensile testing was conducted on some cut pieces of these layers. This series of cross-linked polymers can be elastically stretched up to approximately 820% (without any additive). The addition of additives results in an elasticity of approximately 5% (e.g. with 20% carbon black) to 160% (e.g. with 5% graphene sheets, as a conductive additive).

Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 μm. Each type of these metal fluoride particles, along with graphene sheets (as a conductive additive), was then added into an NMP and PVDF binder suspension to form a multiple-component slurry. The slurry was then slurry-coated on Al foil to form cathode layers.

Figure 5:
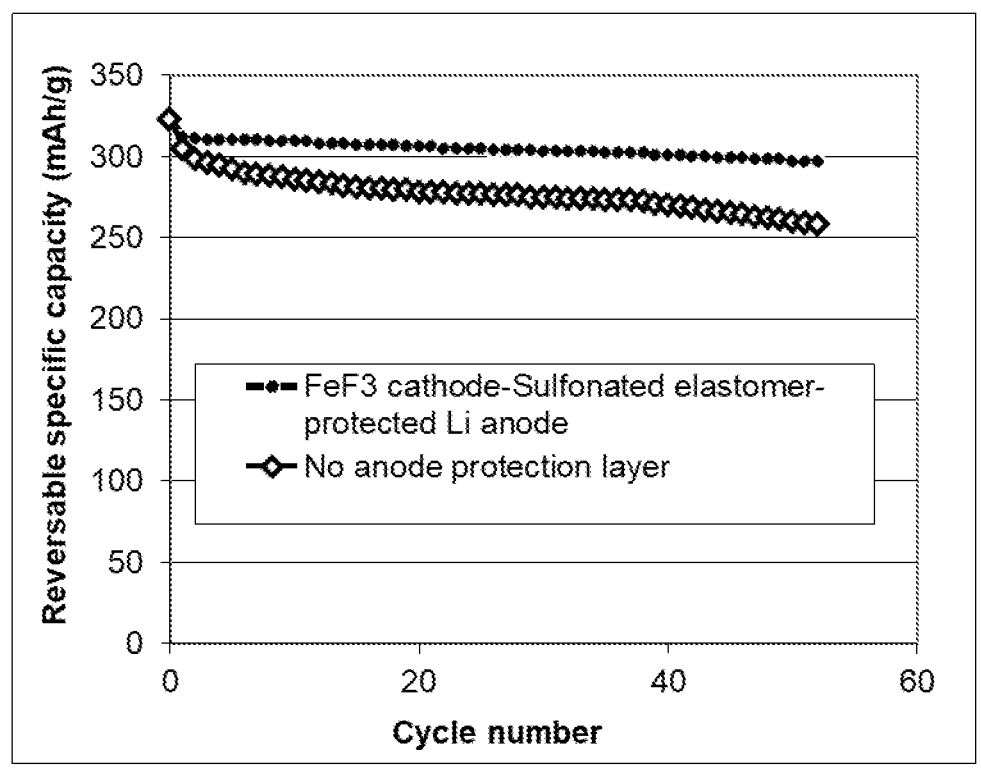
FIG. 5 The discharge capacity curves of three coin cells having a $FeF_3$-based of cathode active materials: (1) one cell having a high-elasticity sulfonated elastomer-protected anode; (2) no anode-protecting layer; and (3) having double protection layers for the anode.

Shown in FIG. 5 are the discharge capacity curves of two coin cells having the same cathode active material ($FeF_3$), but one cell having a sulfonated elastomer-based anode-protecting layer, second cell having no protective layer. These results have clearly demonstrated that the elastomer layer protection strategy provides the best protection against capacity decay of a lithium metal battery.

The elastomer layer appears to be capable of reversibly deforming without breakage when the anode layer expands and shrinks during charge and discharge. The elastomer layer also prevents continued reaction between the liquid electrolyte and the lithium metal. No dendrite-like features were found with the anode being protected by a sulfonated elastomer composite. This was confirmed by using SEM to examine the surfaces of the electrodes recovered from the battery cells after some numbers of charge-discharge cycles.

Example 8: Li-Organic Cell Containing a Naphthalocyanine/Reduced Graphene Oxide (FePc/RGO) Particulate Cathode and a Protected Li Foil Anode Particles of combined FePc/graphene sheets were obtained by ball-milling a mixture of FePc and RGO in a milling chamber for 30 minutes. The resulting FePc/RGO mixture particles were potato-like in shape. Two lithium cells were prepared, each containing a Li foil anode, and a cathode layer of FePc/RGO particles; one cell containing an anode-protecting layer without a porous separator, and the other having a conventional porous separator layer but no anode-protecting layer.

Figure 6:
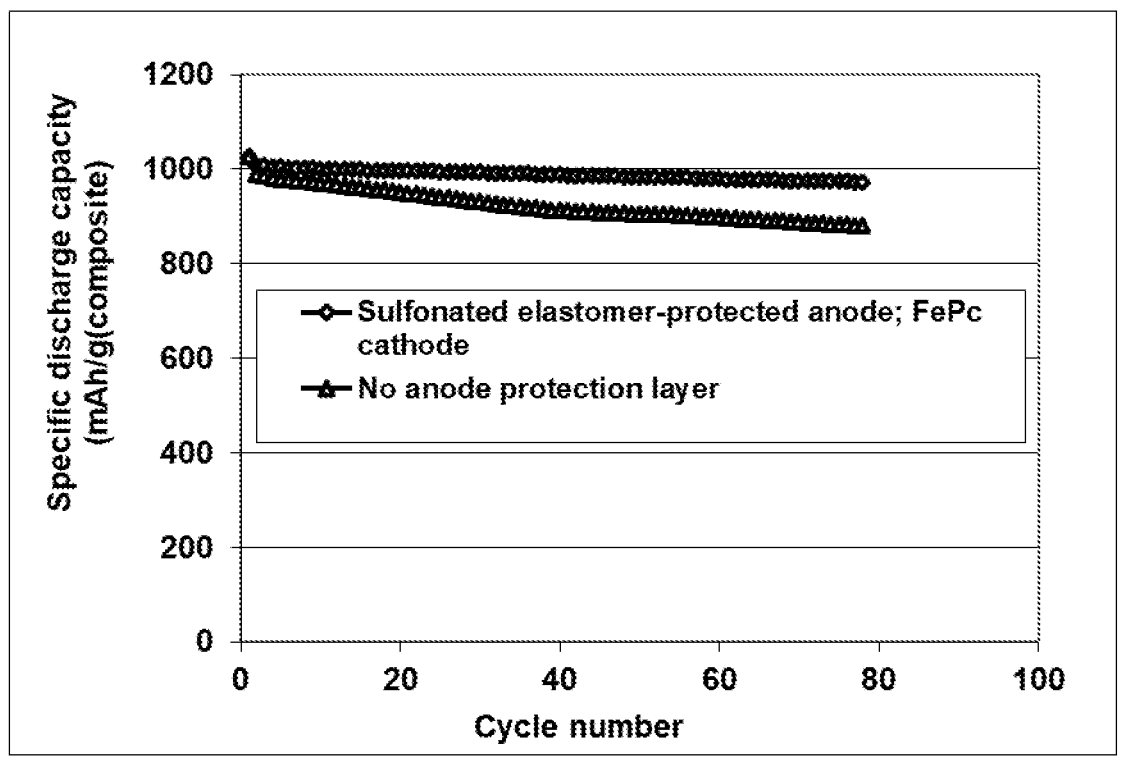
FIG. 6 Specific capacities of two lithium-FePc (organic) cells, each having Li foil as an anode active material and FePc/RGO mixture particles as the cathode active material (one cell containing double layer-protected anode and the other no anode protection layer).

The cycling behaviors of these 2 lithium cells are shown in FIG. 6, which indicates that the lithium-organic cell having a sulfonated elastomer-based protection layer exhibits a significantly more stable cycling response. These protective layers reduce or eliminate the undesirable reactions between the lithium metal and the electrolyte, yet the elastomer layer itself remains in ionic contact with the protected lithium metal and is permeable to lithium ions. This approach has significantly increased the cycle life of all lithium-organic batteries.

Example 9: Effect of Lithium Ion-Conducting Additive in a Sulfonated Elastomer Composite A wide variety of lithium ion-conducting additives were added to several different polymer matrix materials to prepare anode protection layers. The lithium ion conductivity vales of the resulting complex materials are summarized in Table 1 below. We have discovered that these composite materials are suitable anode-protecting layer materials provided that their lithium ion conductivity at room temperature is no less than $10^{-6}$ S/cm. With these materials, lithium ions appear to be capable of readily diffusing through the protective layer having a thickness no greater than 1 μm. For thicker polymer films (e.g. 10 μm), a lithium ion conductivity at room temperature of these sulfonated elastomer composites no less than $10^{-4}$ S/cm would be required.

TABLE 1

Lithium ion conductivity of various sulfonated elastomer composite compositions as a lithium metal-protecting layer.

| Sample No. | Lithium-conducting additive | % sulfonated elastomer (1-2 μm thick) | Li-ion conductivity (S/cm) |
|---|---|---|---|
| E-1p | $Li_2CO_3 + (CH_2OCO_2Li)_2$ | 70-99% | $1.3 \times 10^{-4}$ to $3.3 \times 10^{-3}$ S/cm |
| B1p | $LiF + LiOH + Li_2C_2O_4$ | 60-90% | $4.2 \times 10^{-5}$ to $2.6 \times 10^{-3}$ S/cm |
| B2p | $LiF + HCOLi$ | 80-99% | $1.2 \times 10^{-4}$ to $1.4 \times 10^{-3}$ S/cm |
| B3p | LiOH | 70-99% | $8.5 \times 10^{-4}$ to $1.1 \times 10^{-2}$ S/cm |
| B4p | $Li_2CO_3$ | 70-99% | $4.3 \times 10^{-3}$ to $9.5 \times 10^{-3}$ S/cm |
| B5p | $Li_2C_2O_4$ | 70-99% | $8.2 \times 10^{-4}$ to $1.3 \times 10^{-2}$ S/cm |
| B6p | $Li_2CO_3 + LiOH$ | 70-99% | $1.5 \times 10^{-3}$ to $1.7 \times 10^{-2}$ S/cm |
| C1p | $LiClO_4$ | 70-99% | $4.0 \times 10^{-4}$ to $2.2 \times 10^{-3}$ S/cm |
| C2p | $LiPF_6$ | 70-99% | $2.1 \times 10^{-4}$ to $6.2 \times 10^{-3}$ S/cm |
| C3p | $LiBF_4$ | 70-99% | $1.2 \times 10^{-4}$ to $1.7 \times 10^{-3}$ S/cm |
| C4p | $LiBOB + LiNO_3$ | 70-99% | $1.4 \times 10^{-4}$ to $3.2 \times 10^{-3}$ S/cm |
| S1p | Sulfonated polyaniline | 85-99% | $3.2 \times 10^{-5}$ to $9.5 \times 10^{-4}$ S/cm |
| S2p | Sulfonated PEEK | 85-99% | $1.4 \times 10^{-4}$ to $1.3 \times 10^{-3}$ S/cm |
| S3p | Sulfonated PVDF | 80-99% | $1.7 \times 10^{-4}$ to $1.5 \times 10^{-4}$ S/cm |
| 54p | Polyethylene oxide | 80-99% | $4.2 \times 10^{-4}$ to $3.4 \times 10^{34}$ S/cm |

Example 10: Cycle Stability of Various Rechargeable Lithium Battery Cells

In lithium-ion battery industry, it is a common practice to define the cycle life of a battery as the number of charge-discharge cycles that the battery suffers a 20% decay in capacity based on the initial capacity measured after the required electrochemical formation. Summarized in Table 2 below are the cycle life data of a broad array of batteries featuring an anode with or without an anode-protecting polymer layer.

TABLE 2

Cycle life data of various lithium secondary (rechargeable) batteries.

| Sample ID | Anode-protecting elastomer | Type & % of cathode active material | Initial capacity (mAh/g) | Cycle life (No. of cycles) |
|---|---|---|---|---|
| $CuCl_2$-1e | sulfonated elastomer | 85% by wt. $CuCl_2$ particles (80 nm) + 7% graphite + 8% binder | 537 | 1550 |
| $CuCl_2$-2e | none | 85% by wt. $CuCl_2$ particles (80 nm) + 7% graphite + 8% binder | 536 | 112 |
| $BiF_3$-1e | none | 85% by wt. $BiF_3$ particles + 7% graphene + 8% binder | 275 | 115 |
| $BiF_3$-2e | Sulfonated elastomer + 50% ethylene oxide | 85% by wt. $BiF_3$ particles + 7% graphene + 8% binder | 276 | 1,405 |
| $Li_2MnSiO_4$-1e | sulfonated elastomer composite | 85% C-coated $Li_2MnSiO_4$ + 7% CNT + 8% binder | 254 | 2,230 |
| $Li_2MnSiO_4$-2e | none | 85% C-coated $Li_2MnSiO_4$ + 7% CNT + 8% binder | 252 | 543 |
| $Li_6C_6O_6$-1e | sulfonated elastomer composite + 5% Kevlar fibers | $Li_6C_6O_6$-graphene ball-milled | 439 | 1,444 |
| $Li_6C_6O_6$-2e | none | $Li_6C_6O_6$-graphene ball-milled | 438 | 116 |
| $MoS_2$-1e | sulfonated elastomer composite | 85% $MoS_2$ + 8% graphite + binder | 224 | 1,545 |
| $MoS_2$-2e | none | 85% $MoS_2$ + 8% graphite + binder | 225 | 156 |

In conclusion, the anode protecting layer is surprisingly effective in alleviating the problems of lithium metal dendrite formation and lithium metal-electrolyte reactions that otherwise lead to rapid capacity decay and potentially internal shorting and explosion of the lithium secondary batteries. The elastomer layer appears to be capable of expanding or shrinking congruently or conformably with the anode active material layer. This capability helps to maintain a good contact between the current collector (or the lithium film itself) and the protective layer, enabling uniform re-deposition of lithium ions without interruption.

I claim:
1. A lithium metal secondary battery comprising a cathode, an anode, and a non-solid state electrolyte without a porous separator disposed between said cathode and said anode, wherein said anode comprises:
   a) an anode active material layer of lithium or lithium alloy, in a form of a foil, coating, or multiple particles aggregated together, as anode active material; and
   b) an anode-protecting layer in physical contact with said anode active material layer, having a thickness from 10.1 μm to 100 μm and comprising an elastomer having a fully recoverable tensile elastic strain from 2% to 1,000% and a lithium ion conductivity from $10^{-8}$ S/cm to $5\times10^{-2}$ S/cm when measure at room temperature;
   wherein said lithium metal secondary battery does not include a lithium-sulfur battery or lithium-selenium battery.

2. The lithium metal secondary battery of claim 1, wherein said non-solid state electrolyte is selected from the group consisting of organic liquid electrolyte, ionic liquid electrolyte, polymer gel electrolyte, quasi-solid electrolyte having a lithium salt dissolved in an organic or ionic liquid with a lithium salt concentration higher than 2.0 M, and combinations thereof.

3. The lithium metal secondary battery of claim 1, wherein said anode active material layer, said anode-protecting layer, and said cathode are laminated together in such manner that the battery is under a compressive stress or strain.

4. The lithium metal secondary battery of claim 1, wherein said elastomer contains a material selected from non-sulfonated and sulfonated versions selected from the group consisting of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, and combinations thereof.

5. The lithium metal secondary battery of claim 1, wherein said elastomer comprises from 0.01% to 50% of an electrically non-conducting reinforcement material dispersed therein, wherein said reinforcement material is selected from the group consisting glass fiber, ceramic fiber, polymer fiber, glass particle, ceramic particle, polymer particle, and combinations thereof.

6. The lithium metal secondary battery of claim 1, wherein said elastomer further contains from 0.1% to 40% by weight of a lithium ion-conducting additive dispersed therein.

7. The lithium metal secondary battery of claim 6, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x<1$ and $1\leq y\leq 4$.

8. The lithium metal secondary battery of claim 6, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

9. The lithium metal secondary battery of claim 6, wherein said lithium ion-conducting additive comprises a lithium ion-conducting polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, and combinations thereof.

10. The lithium metal secondary battery of claim 1, wherein said cathode active material is selected from an inorganic material, an organic material, a polymeric material, or a combination thereof, and said inorganic material does not include sulfur or alkali metal poly sulfide.

11. The lithium metal secondary battery of claim 10, wherein said inorganic material is selected from a metal oxide, metal phosphate, metal silicide, metal selenide, transition metal sulfide, or a combination thereof.

12. The lithium metal secondary battery of claim 10, wherein said inorganic material is selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, and combinations thereof.

13. The lithium metal secondary battery of claim 10, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, CuF, $SnF_2$, AgF, $CuCl_2$, $FeCl_3$, $MnCl_2$, and combinations thereof.

14. The lithium metal secondary battery of claim 10, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq 1$.

15. The lithium metal secondary battery of claim 10, wherein said inorganic material is selected from a transition metal dichalcogenide, a transition metal trichalcogenide, or a combination thereof.

16. The lithium metal secondary battery of claim 10, wherein said inorganic material is selected from the group consisting of $TiS_2$, $TaS_2$, $MoS_2$, $NbSe_3$, $MnO_2$, $CoO_2$, an iron oxide, a vanadium oxide, and combinations thereof.

17. The lithium metal secondary battery of claim 11, wherein said metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

18. The lithium metal secondary battery of claim 11, wherein said metal oxide or metal phosphate is selected from the group consisting of layered compound $LiMO_2$, spinel compound $LiM_2O_4$, olivine compound $LiMPO_4$, silicate compound $Li_2MSiO_4$, tavorite compound $LiMPO_4F$, borate compound $LiMBO_3$, and combinations thereof, wherein M is a transition metal or a mixture of multiple transition metals.

19. The lithium metal secondary battery of claim 10, wherein said inorganic material is selected from the group consisting of (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, and (e) combinations thereof.

20. The lithium metal secondary battery of claim 10, wherein said organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, hexaazatrinaphtylene (HATN), hexaazatriphenylene hexacarbonitrile ($HAT(CN)_6$), 5-benzylidene hydantoin, isatine lithium salt, pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

21. The lithium metal secondary battery of claim 20, wherein said thioether polymer is selected from the group consisting of poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, and poly[3,4(ethylenedithio)thiophene] (PEDTT).

22. The lithium metal secondary battery of claim 10, wherein said organic material contains a phthalocyanine compound selected from the group consisting of copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, and combinations thereof.

\* \* \* \* \*